(12) United States Patent
Miglianico

(10) Patent No.: US 7,177,789 B1
(45) Date of Patent: Feb. 13, 2007

(54) METHOD AND APPARATUS FOR TESTING THE OPERATION OF AN ELECTRONIC UNIT BY SIMULATION

(75) Inventor: Denis Miglianico, Tassin (FR)

(73) Assignee: Alstom, Paris (FR)

( * ) Notice: Subject to any disclaimer, the term of this patent is extended or adjusted under 35 U.S.C. 154(b) by 713 days.

(21) Appl. No.: 09/650,726

(22) Filed: Aug. 30, 2000

(30) Foreign Application Priority Data

Aug. 31, 1999 (FR) .................................. 99 11034

(51) Int. Cl.
*G06F 17/50* (2006.01)

(52) U.S. Cl. .............................. 703/14; 703/7; 703/13; 703/19; 318/439

(58) Field of Classification Search .................. 703/14, 703/7, 13, 19; 318/439
See application file for complete search history.

(56) References Cited

U.S. PATENT DOCUMENTS

| | | | | |
|---|---|---|---|---|
| 4,385,278 A | * | 5/1983 | Sterling ....................... | 324/381 |
| 4,777,618 A | * | 10/1988 | Nakano et al. ................ | 703/8 |
| 5,808,921 A | * | 9/1998 | Gold et al. .................. | 702/108 |
| 5,954,782 A | * | 9/1999 | Togai ......................... | 701/105 |
| 6,269,020 B1 | * | 7/2001 | Turner ........................ | 365/154 |

FOREIGN PATENT DOCUMENTS

EP          0 859 238 A2    8/1998

OTHER PUBLICATIONS

Herbert Hanselmann, "Hardware-in-the-Loop Simulation Testing and its Integration into a CACSD Toolset", 1998 IEEE International Symposium on Computer-Aided Control System Design, pp. 152-156.*
Bielewicz et al., "A DSP and FPGA Based Integrated Controller Development Solutions for High Performance Electric Drives", Proceedings of the IEEE International Symposium on Industrial Electronics, 1996, pp. 679-684.*
Wagner, J. R.: "Failure mode testing tool set for automotive electronic controllers" IEEE Transactions on Vehicular Technology, US, IEEE Inc. New York, vol. 43, No. 1, Feb. 1, 1994, pp. 156-163, XP000450957 ISSN: 0018-9545.
Hanselmann, H.: "Real-time simulation replaces test drives" Test and Measurement World. (Inc. Electronics Test), US, Cahners Publishing, Denver, vol. 16, No. 3, Feb. 15, 1996, pp. 35-36, 38, 40, XP000559454 ISSN: 0744-1657.

* cited by examiner

*Primary Examiner*—Kamini Shah
*Assistant Examiner*—Herng-der Day
(74) *Attorney, Agent, or Firm*—Sughrue Mion, PLLC

(57) ABSTRACT

A simulator fitted with at least one microprocessor sends input simulation signals to a unit under test, and receives therefrom output signals in reaction thereto. The method consists in processing some of the output signals from the unit as they are issued by means of a programmable logic circuit, in storing parameter values corresponding to said processed signals, and in giving the microprocessor access to the stored parameter values at a frequency which is compatible with its own operating speed. The apparatus enables the method to be implemented. The simulator comprises at least one programmable logic circuit, e.g. of the FPGA type, that is suitable for receiving at least some of the signals output by the electronic unit.

9 Claims, 3 Drawing Sheets

METHOD AND APPARATUS FOR TESTING THE OPERATION OF AN ELECTRONIC UNIT BY SIMULATION

The invention relates to a method and to apparatus for testing the operation of an electronic unit by simulation. The invention also relates to an installation for testing electronic units for fitting to rail vehicles or electric vehicles.

BACKGROUND OF THE INVENTION

In the field of electronically controlling traction systems for rail vehicles, it is known to use electronic units that operate in real time and that are designed to control electronic circuits such as gate turnoff (GTO) thyristors or insulated gate bipolar transistors (IGBT), low voltage relays, or digital or analog indicators. Such units include a computer suitable for generating control signals as a function of signals received at inputs of the unit, said input signals possibly being a reference value, signals representative of the state of a low voltage relay, signals representative of a current, of a voltage, or of power consumption, and/or signals issued by an on-board computer network. In order to control electronic circuits of the GTO or IGBT type effectively, the control signals issued by such an electronic unit must be positioned in time with precision of microsecond order.

Since such a control unit constitutes a complex piece of equipment, it is known to provide a test bench having a simulator suitable for generating simulated signals which are supplied to the inputs of the unit, and to analyze the control signals generated by such a unit. Such a simulator operates in real time and simulates, for example, the motor, the brakes, or the inertia of a rail motor unit, and also simulates the state of the rails or other external parameters. A single type of simulator is used for testing the operation of various different electronic units, with the operation of the simulator being adapted by being programmed as a function of the type and the purpose of the unit. Such a simulator comprises one or more microprocessors for processing signals issued by the unit so as to send new simulation signals thereto. Such a simulator is of the type which includes hardware in the loop.

Unfortunately, given the computer processing they need to perform, simulation programs operate with a cycle time of the order of several tens of microseconds, said cycle times being much greater than the precision desired of the electronic unit, which precision is of microsecond order. In other words, when it has acquired a signal generated by the unit to be inspected, the microprocessor or computer works "blind" for several tens of microseconds before generating a new simulation signal. Consideration might be given to interrupting the operation of the microprocessor frequently, e.g. once every microsecond, so as to acquire a new value of the signal issued by the unit, however that would significantly disturb the operation of the computer which could no longer deal with the numerous values acquired. In addition, such a solution is not technically feasible when the desired precision is itself of microsecond order.

OBJECTS AND SUMMARY OF THE INVENTION

Those are the drawbacks which the present invention seeks most particularly to remedy by proposing a method which enables an electronic unit to be subjected to simulation in real time and with great precision, with great stability of the simulated signals, and with effective monitoring of the signals issued by the unit.

To this end, the invention provides a method which comprises processing some of the output signals from said unit as they are issued by means of at least one programmable logic circuit, in storing values of parameters corresponding to said processed signals, and in causing said microprocessor to access said stored parameter values at a frequency which is compatible with its own operating frequency.

By means of the invention, the programmable logic circuit makes it possible to acquire the output signals generated by the unit very fast, i.e. in real time, which output signals can be the orders applied to a GTO or a IGBT circuit, and it can do this even though the microprocessor of the simulator is performing calculation operations. Once these calculation operations are over, i.e. after a period of 10 milliseconds, for example, the microprocessor can then acquire the values processed by the programmable logic circuit over that period, which values are stored in a buffer memory. Thus, the positions in time and the values of the signals issued by the electronic unit can be determined with high precision without disturbing the operation of the microprocessor of the simulator.

According to advantageous aspects of the invention, the method incorporates one or more of the following characteristics:

- The stored parameter values are representative of switching instants in the logic signals generated by the unit. In particular, these values can be images of switching instants, of the duration during which a logic variable has a predetermined value and/or the average value of a logic variable over a predetermined period. Thus, as a function of the type of variable monitored by the simulator, it can acquire on a single occasion and quickly information that is representative of the various instantaneous values of signals during the period under consideration.
- The method comprises sending at least some of the signals generated by the microprocessor to at least a second programmable logic circuit and in sending to the electronic unit simulation signals generated by said second programmable logic circuit while the microprocessor is not in communication with the unit. In other words, the orders generated by the microprocessor are delivered to the electronic unit via the second programmable logic circuit during a period in which the microprocessor is busy, e.g. calculating the next control parameters. By means of this aspect of the invention, it is possible to control the unit with signals that are issued with very great precision, of microsecond order, which is representative of certain sensors, such as an incremental speed sensor which detects the positions of notches on a disk with precision that is considerably shorter than several tens of microseconds.

The invention also provides apparatus enabling the above-described method to be implemented, and more specifically, apparatus which includes a simulator comprising at least one microprocessor and suitable for sending simulation signals to the inputs of the unit and for receiving response output signals therefrom. The simulator comprises at least one programmable logic circuit suitable for receiving at least some of the output signals generated by the unit, said logic circuit being suitable for operating in real time to generate parameter values corresponding to the signals it received and to store said values, the microprocessor being suitable for acquiring said stored values.

By means of the invention, the programmable logic circuit makes it possible to capture in real time the orders or output signals delivered by the electronic unit during a work cycle of the microprocessor, with the microprocessor making use of values that have been accumulated, e.g. in a buffer memory, during each of its work cycles.

According to advantageous aspects of the invention, the apparatus comprises one or more of the following characteristics:

At least one second programmable logic circuit of the simulator is suitable for sending simulation signals in real time to the unit based on reference signals previously issued by the microprocessor. By means of this aspect of the invention, there is decoupling between the operation of the microprocessor program (having a cycle time of the order of a few tens of microseconds) and the operation of the unit (which must be capable of responding to signals themselves issued at any instant with precision of microsecond order, or even more quickly as a function of technological evolution), and this decoupling is used both on input and output to and from the electronic unit. Under such circumstances, the first and second above-mentioned logic circuits are advantageously physically implemented in a single electronic circuit.

Either one, or both, of the above-mentioned programmable logic circuits may be of the field programmable gate array (FPGA) type. Like a microprocessor, an FPGA circuit is a component that is programmable by software. The use of this type of fast component in association with a programmable processor makes it possible to design generic real time process simulators adaptable to any type of process, i.e. to any type of electronic unit and to their conditions of use.

The simulator also comprises an analog-to-digital converter enabling digital signals representative of analog signals as generated by the unit to be forwarded to the microprocessor, and/or it comprises a digital-to-analog converter enabling analog simulation signals to be forwarded to the unit on the basis of digital signals generated by the microprocessor.

Either one, or both, of the above-mentioned logic circuits may be programmed as a function of the intended type and/or use of the unit.

Finally, the invention provides an installation for testing electronic units for fitting to a rail vehicle or to an electric vehicle, such as a bus or the like, which installation comprises at least one apparatus as described above. Such an installation operates with precision and can be configured as a function of the electronic units to be inspected and as a function of their environment, e.g. as a function of the type of vehicle on which they are to be fitted, such as a train, a high speed train, a tram, a bus, etc.

BRIEF DESCRIPTION OF THE DRAWINGS

The invention will be better understood and other advantages thereof will appear more clearly in the light of the following description of two embodiments of apparatus for testing the operation of an electronic unit in accordance with the principles and the method of operation of the invention, which embodiments are given purely by way of example and are described with reference to the accompanying drawings, in which.

MORE DETAILED DESCRIPTION

Figure 1:
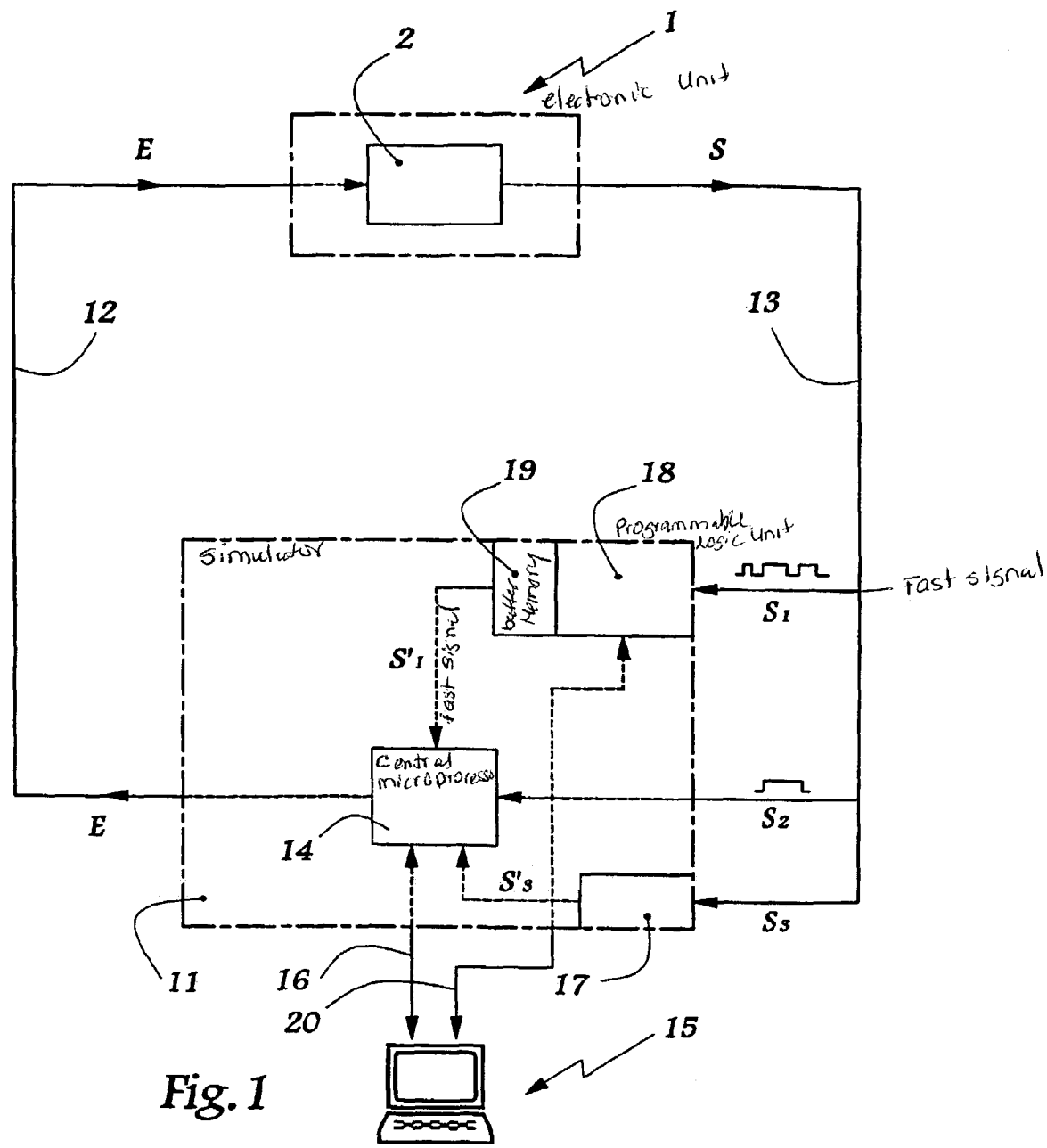
FIG. 1 is a block diagram of apparatus in accordance with the invention for testing the operation of an electronic unit.

The electronic unit 1 shown in FIG. 1 is designed to be fitted on board a vehicle to control a traction motor, e.g. in a motor unit of a train. It includes a microprocessor 2 suitable for generating control signals or output signals S as a function of input signals E delivered by measuring systems or by master control electronic units.

Prior to being installed on board the vehicle in question, the unit 1 is connected to a simulator 11 by means of two bundles 12 and 13 of electrical conductors. More precisely, the bundle 12 connects the output of the simulator 11 to the input of the unit 1, while the bundle 13 connects the output of the unit 1 to the input(s) of the simulator 11. The bundle 12 therefore serves to carry simulation input signals E to the unit 1, while the bundle 13 serves to carry output signals S as generated by the unit to the simulator 11, which output signals constitute control signals for equipment on board the vehicle.

The simulator 11 has a program which runs on a microprocessor 14, e.g. of the digital signal processor (DSP) type, having a cycle time of the order of a few tens of microseconds and suitable for generating the simulation signals E. These simulation signals can represent low-voltage relay status signals, signals issued by current or voltage sensors, such as incremental sensors, or reference values generated by one or more master electronic units and forwarded over a computer network. The microprocessor can be connected to a console 15 for programming and control purposes, and also for displaying the results of testing. An electrical link 16 is provided for this purpose.

The output signals S generated by the unit 1 comprise fast signals $S_1$, relatively slow signals $S_2$, and analog signals $S_3$.

The relatively slow signals are control signals whose position in time needs to be known with precision of millisecond order, i.e. compatible with the cycle time of the microprocessor 14. These signals can therefore be transmitted directly to the microprocessor 14 which acquires the values thereof once per cycle time, i.e. once every few tens of microseconds.

The signals $S_3$ are applied to an analog-to-digital converter (ADC) 17 which forwards a corresponding digital signal $S'_3$ to the microprocessor 14.

The signals $S_1$ can vary several times within a period $\Delta T$ of duration of several tens of microseconds, and the instants at which they change or switch must be known with precision. These signals $S_1$ can, for example, be control signals for GTO or IGTP circuits, or for relays.

Figure 2:
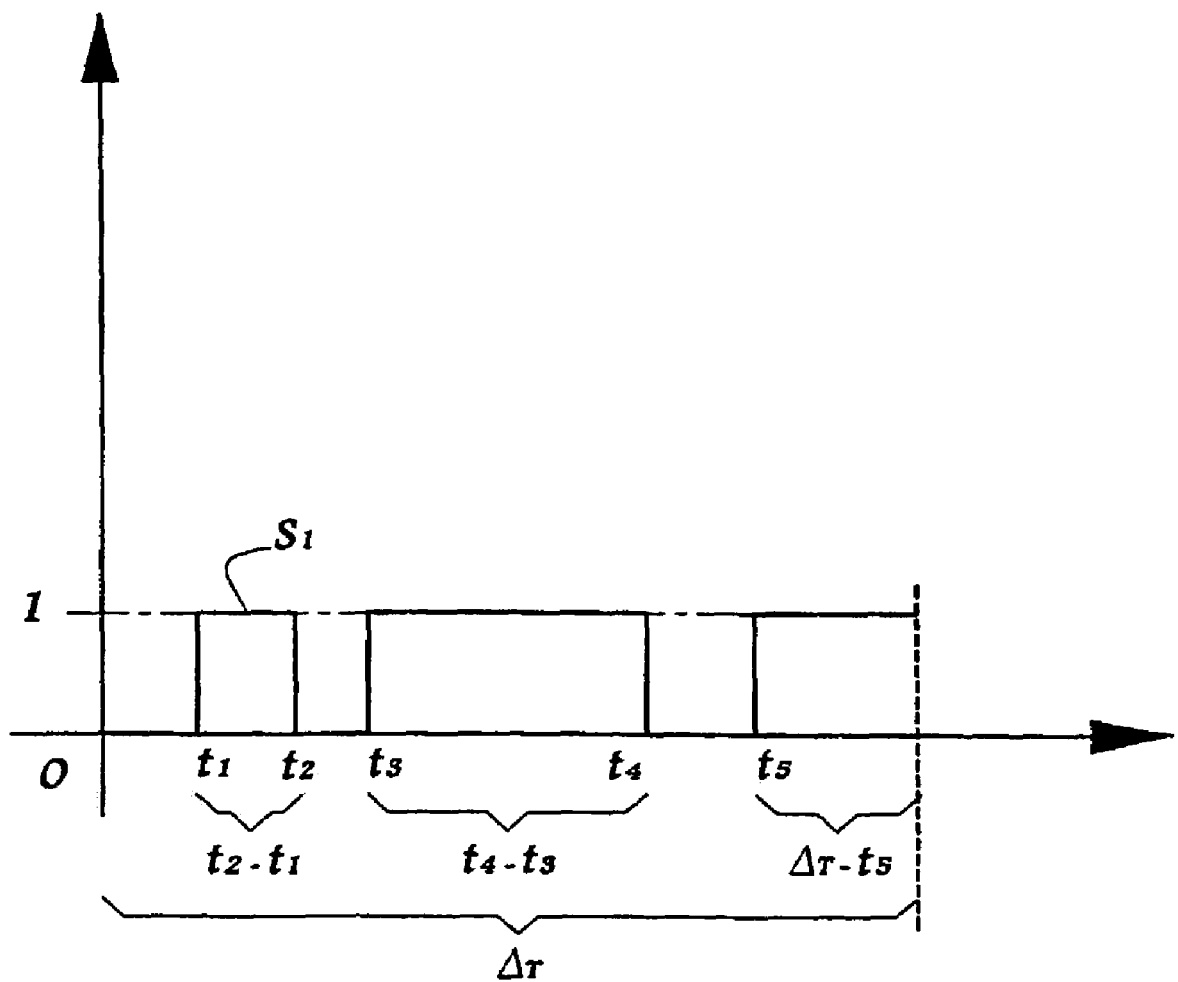
FIG. 2 is a timing diagram showing how the values of a parameter generated by the FIG. 1 electronic unit vary over a period $\Delta T$.

As can be seen in FIG. 2, a signal $S_1$ can take logic values 0 or 1 and its variation over a single period $\Delta T$ can be characterized by its switching instants $t_1$, $t_2$, $t_3$, $t_4$, and $t_5$. Each signal $S_1$ is applied to an input of a programmable logic circuit 18 of the FPGA type which is capable of detecting the instants $t_1$ to $t_5$ during a period $\Delta T$, together with the direction in which the signal $S_1$ varies over said period. The circuit 18 reacts with very great precision to variations in the signal $S_1$ since it is a circuit made up of logic AND and OR gates and of bistables, which can have a cycle time that is shorter than 1 microsecond.

The values detected by the circuit 18 are forwarded, possibly after logic processing, to a buffer memory 19 to which the microprocessor 14 has access at the end of each of its work periods, i.e. once every few tens of microseconds, in order to find out how each signal $S_1$ has varied during the period under consideration.

The values stored in the memory 19 can be references to the instants $t_1$ to $t_5$ during the period $\Delta T$ in question, or the total value $\Sigma_1$ of the signal $S_1$ during said period, i.e. corresponding to the time during which the signal $S_1$ had the value 1. This value $\Sigma_1$ is equal to the sum of the time intervals during which $S_1$ is equal to 1, i.e., in the example shown:

$$\Sigma_1 = \Delta T - t_5 + t_4 - t_3 + t_2 - t_1$$

The value forwarded to the memory 19 can also be the mean $M_1$ of the value of the signal $S_1$ over the period $\Delta T$, or any other value that is representative of the way the signal $S_1$ varied over said period.

The value $S'_1$ forwarded to the microprocessor 14 as being representative of the signal $S_1$ can vary as a function of the way in which the circuit 18 is programmed. Depending on the nature of the parameter $S_1$, the type of the unit 1, and its operating configuration, the value for forwarding to the microprocessor 14 can be different.

By means of the invention, the circuit 18 operates as an "asynchronous sampler" for the microprocessor 14 and makes it possible to interrogate certain outputs of the unit 1 in real time without distributing the operation of the microprocessor 14 and without the computational power required for the microprocessor 14 being excessive.

Figure 3:
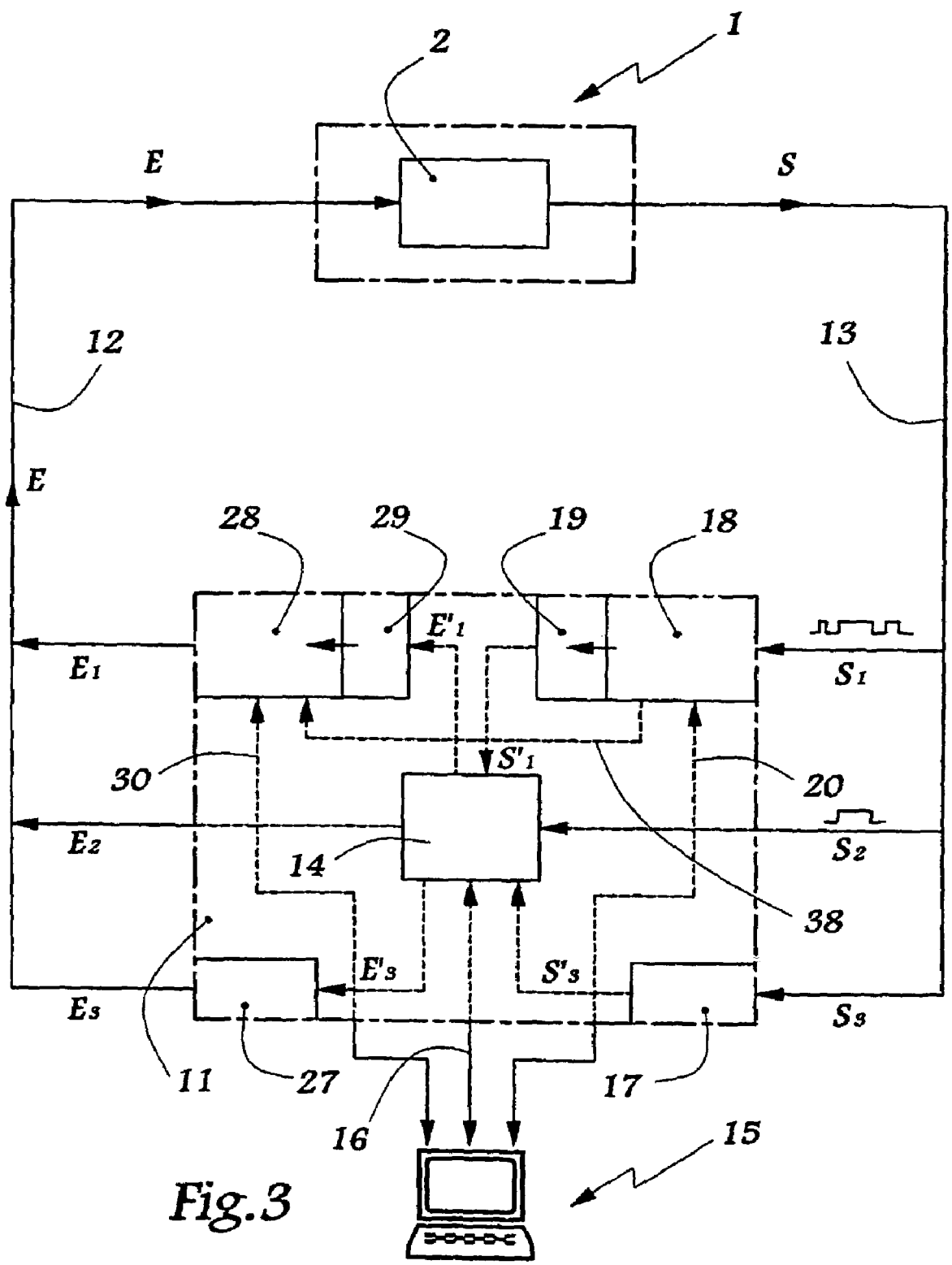
FIG. 3 is a diagram analogous to FIG. 1 showing apparatus constituting a second embodiment of the invention.

In the second embodiment of the invention shown in FIG. 3, elements that are analogous to those of the embodiment of FIG. 1 are given identical references.

This embodiment differs from the preceding embodiments essentially in that the input signals E of the unit 1 are subdivided into fast signals $E_1$, into relatively slow signals $E_2$, and into analog signals $E_3$.

The signals $E_2$ are generated directly by the microprocessor 14 at the end of each operating cycle and they are forwarded to the unit 1. The signals $E_3$ are generated by a digital-to-analog converter (DAC) 27 on the basis of digital signals $E'_3$ delivered by the microprocessor 14.

The fast signals $E_1$ are generated by a second programmable logic circuit 28 of the same type as the circuit 18 and associated with a buffer memory 29.

Operation is as follows: at the end of a computation cycle, the microprocessor 14 sends signals $E'_1$ to the memory 29 that are representative of the various values that the signals $E_1$ are to take during the following period $\Delta T$. On the basis of these values, and while the microprocessor 14 is calculating the following values and is not in communication with the unit 1 or the memory 29, the circuit 28 generates the simulation signals $E_1$ for the unit 1. In other words, the circuit 28 makes it possible with great precision in time to simulate variations in the signals $E_1$ during a period $\Delta T$ in which the microprocessor 14 is dedicated to performing computation operations.

For example, the circuit 28 can generate pulses which simulate an incremental speed sensor which, in reality, can be a succession of squarewave pulses with a period of the order of a few microseconds.

In an advantageous but not essential feature of the invention, the circuits 18 and 28 are interconnected directly by a link 38 which enables some of the signals $S_1$ to be forwarded directly from the circuit 18 to the circuit 28, these signals being processed by the circuits 18 and 28 to generate certain output signals $E_1$ without intervention by the microprocessor 14.

The circuits 18 and 28 are represented as two separate entities in FIG. 3. It is possible and advantageous for them to be integrated in a single electronic circuit.

Whatever the embodiment used, the programmable logic circuit(s) 18 or 28 can be configured, e.g. by means of the console 15 to which they are connected by links 20 and 30, as a function of the type of unit 1 to be tested and/or of its subsequent environment, e.g. the type of rail vehicle to which the unit is to be fitted.

The use of FPGA type circuits is advantageous economically speaking since such circuits are fast, mature technologically speaking, i.e. reliable, and of acceptable price.

The invention makes it possible in real time to simulate faults, such as a short circuit in one of the branches of a high-voltage inverter, and to verify in real time that the control pulses generated by the unit 1 occur at moments that are appropriate for simulated power semiconductors such as GTO or IGBT circuits. In particular, the minimum ignition time or the minimum non-ignition time can be monitored effectively.

The invention is shown above with a single input FPGA circuit, and in the embodiment of FIG. 3, a single output FPGA circuit. Naturally, a plurality of such circuits could be used for input and/or output depending on the nature of the signals to be processed.

The invention claimed is:

1. A method of testing the operation of an electronic unit by stimulating said unit with simulated input signals to said unit, the method comprising:

sending simulated input signals to said unit and receiving slow output signals from said unit in response to said simulated input signals by at least one microprocessor;

receiving fast output signals in response to said simulated input signals by at least one programmable logic circuit;

processing the fast output signals by the at least one programmable logic circuit to generate parameter values at a first frequency;

storing said parameter values corresponding to said processed signals in a storing circuit; and accessing said stored parameter values by the at least one microprocessor at a second frequency which is slower than said first frequency and is compatible with an operating frequency of the microprocessor that generates said simulated input signals, wherein said at least one programmable logic circuit is of a field programmable gate array type.

2. A method according to claim 1, wherein said parameter values are representative of switching instants of said fast output signals.

3. A method according to claim 2, wherein said parameter values are an image of said switching instants, of the duration during which a logic variable has a predetermined value, and/or the mean value of a logic variable over a predetermined period.

4. An apparatus for testing the operation of an electronic unit by simulation, said unit generating logic signals at specific instants, said apparatus comprising a simulator which comprises:

at least one microprocessor sending simulated input signals to said unit and receiving slow output signals from said unit in response to said simulated input signals;

at least one programmable logic circuit which receives at least one of fast output signals from said unit, said at least one programmable logic circuit processing the fast output signals to generate, at a first frequency, parameter values corresponding to the fast output signals; and a storing circuit which stores said parameter values, wherein said microprocessor accesses said stored parameter values at a second frequency which is slower than said first frequency and is compatible with an operating frequency of said microprocessor, wherein said at least one programmable logic circuit is of a field programmable gate array type.

5. An apparatus according to claim 4 further comprising at least one second programmable logic circuit which sends in real time simulation signals to said unit on the basis of reference signals previously issued by said microprocessor.

6. An apparatus according to claim 5, wherein said programmable logic circuit which receives said at least one of said fast output signals and said second programmable logic circuit which sends simulation signals to said unit are implemented as a single electronic circuit.

7. An apparatus according to claim 5, wherein said at least one second programmable logic circuit is of the field programmable gate array type.

8. An apparatus according to claim 5, wherein said at least one programmable logic circuit and said at least one second programmable logic circuit is programmed as a function of a type and/or intended use of said unit.

9. An apparatus according to claim 4, wherein said simulator further comprises at least one of:

an analog-to-digital converter which forward digital signals representative of analog signals generated by said unit to said microprocessor, and a digital-to-analog converter which forwards analog simulation signals based on digital signals generated by said microprocessor to said unit.

* * * * *